US012512736B2

United States Patent
Sinkhorn et al.

(10) Patent No.: US 12,512,736 B2
(45) Date of Patent: Dec. 30, 2025

(54) REPLACEMENT OR REPAIR OF GENERATOR NEUTRAL RING

(71) Applicant: Electromechanical Engineering Associates, Inc., Monroeville, PA (US)

(72) Inventors: Jason Sinkhorn, Greensburg, PA (US); Corey Palmer, Greensburg, PA (US); Christopher J. Mascaro, Gibsonia, PA (US); Thomas J. Schildkamp, Greensburg, PA (US)

(73) Assignee: Electromechanical Engineering Associates, Inc., Monroeville, PA (US)

( * ) Notice: Subject to any disclaimer, the term of this patent is extended or adjusted under 35 U.S.C. 154(b) by 0 days.

(21) Appl. No.: 18/717,103

(22) PCT Filed: Dec. 6, 2022

(86) PCT No.: PCT/US2022/051930
§ 371 (c)(1),
(2) Date: Jun. 6, 2024

(87) PCT Pub. No.: WO2023/107427
PCT Pub. Date: Jun. 15, 2023

(65) Prior Publication Data
US 2025/0047182 A1 Feb. 6, 2025

Related U.S. Application Data

(60) Provisional application No. 63/286,949, filed on Dec. 7, 2021, provisional application No. 63/286,528, filed on Dec. 6, 2021.

(51) Int. Cl.
*H02K 15/50* (2025.01)
*H02K 7/18* (2006.01)

(52) U.S. Cl.
CPC ............. *H02K 15/50* (2025.01); *H02K 7/183* (2013.01); *H02K 2203/09* (2013.01)

(58) Field of Classification Search
CPC ...................................................... H02K 15/50
See application file for complete search history.

(56) References Cited

U.S. PATENT DOCUMENTS 5,508,571 A * 4/1996 Shafer, Jr. ................. H02K 3/50
310/216.115
9,083,220 B2 * 7/2015 Neumann ............... H02K 15/35
(Continued)

OTHER PUBLICATIONS

International Search Report and Written Opinion mailed on Mar. 22, 2023 for corresponding International Application No. PCT/US2022/051930.

*Primary Examiner* — Jacob J Cigna
(74) *Attorney, Agent, or Firm* — Lisa E. Geary; Eckert Seamans Cherin & Mellott LLC (57) ABSTRACT

Systems for replacement of the neutral ring of a rotating electric machine, such as a doubly-fed induction generator (DFIG) useful in a wind turbine, and methods for up-tower repair of the neutral ring. The system generally includes a neutral ring having first, second, and third ring sections formed or two or more laminated layers of copper, and first, second, and third neutral ring connector formed of solid copper. Each of the first, second, and third neutral ring connectors include a cup-shaped fixture extending radially outward from the neutral ring via a riser and are configured for attachment with coils of the winding.

11 Claims, 7 Drawing Sheets

(56) References Cited

U.S. PATENT DOCUMENTS

| | | | | |
|---|---|---|---|---|
| 9,143,022 B2* | 9/2015 | Neumann | ............... | H02K 15/50 |
| 9,334,850 B2* | 5/2016 | Neumann | ............... | H02K 15/50 |
| 10,038,357 B2* | 7/2018 | Neumann | ............... | H02K 15/50 |
| 10,107,256 B2* | 10/2018 | Neumann | ............... | H02K 15/50 |
| 10,177,621 B2* | 1/2019 | Kunihiro | ............... | H02K 19/26 |
| 10,658,898 B2* | 5/2020 | Hayasaka | ............... | H02K 15/10 |
| 10,823,154 B2* | 11/2020 | Hodges | ................... | F03D 80/50 |
| 11,962,205 B2* | 4/2024 | de Swardt | ............... | H02K 3/51 |
| 2003/0201688 A1* | 10/2003 | Yamamura | ............. | H02K 3/522 |
| | | | | 310/71 |
| 2011/0133459 A1* | 6/2011 | Fischer | ................... | H02P 9/007 |
| | | | | 290/44 |
| 2013/0049501 A1* | 2/2013 | Fujisaki | ................. | H02K 3/522 |
| | | | | 310/71 |
| 2015/0101180 A1 | 4/2015 | Neumann et al. | | |
| 2017/0098984 A1* | 4/2017 | Sørensen | ............... | H02K 7/183 |
| 2017/0176536 A1* | 6/2017 | Grubic | ................... | G01R 31/44 |
| 2018/0205297 A1* | 7/2018 | Toledo | ................. | H02K 7/1838 |
| 2019/0040847 A1* | 2/2019 | Hodges | ................... | F03D 80/50 |
| 2019/0356189 A1 | 11/2019 | Totsuka et al. | | |
| 2022/0278595 A1* | 9/2022 | Palmer | ..................... | H02K 3/50 |

* cited by examiner

REPLACEMENT OR REPAIR OF GENERATOR NEUTRAL RING

CROSS-REFERENCE TO RELATED APPLICATIONS

This application is a U.S. national stage filing under 35 U.S.C. § 371 of International Application No. PCT/US2022/051930, filed on Dec. 6, 2022, which claims priority to U.S. Provisional Patent Application Ser. Nos. 63/286,528 filed Dec. 6, 2021, and 63/286,949 filed Dec. 7, 2021, which are incorporated herein by reference in their entirety.

FIELD OF INVENTION

This disclosure generally relates to devices, systems, and methods for replacement and repair of a generator neutral ring.

BACKGROUND

The use of wind turbines to capture wind power is growing at a fast pace worldwide. The Doubly-Fed Induction Generator (DFIG) is widely adopted in wind turbines because of its variable speed operational capability, low operating noise, mechanical stress mitigation, and control flexibility for active and reactive power.

The DFIG consists of a three-phase wound rotor and a three-phase wound stator. The rotor is fed with a three-phase AC signal that induces an AC current in the rotor windings. As the wind turbines rotate, they exert mechanical force on the rotor causing it to rotate. As the rotor rotates, the magnetic field produced due to the AC current also rotates at a speed proportional to the frequency of the AC signal applied to the rotor windings. As a result, a constantly rotating magnetic flux passes through the stator windings causing induction of an AC current in the stator winding. Thus, the speed of rotation of the stator magnetic field depends on the rotor speed as well as the frequency of the AC current fed to the rotor windings.

Many types of DFIG rotor connection schemes exist and are produced by a variety of manufacturers. The rotor connection scheme, colloquially called "wye rings", is the electrical connection for the three-phase winding housed by the rotor. The rotor is connected in a wye configuration; hence the term wye rings. The wye rings themselves consist of connections for each of the three phases, a neutral ring, and in most designs, one or more parallel jumpers between connections of the same phase.

Original manufacturer DFIG rotor connection schemes have a plurality of failure modes. Some of the failure modes are a result of improper design and/or strength of the components. In most cases, however, the failures are a result of rigid mechanical coupling between the outside diameter (OD) and the inside diameter (ID) of the rotor components.

Figure 1:
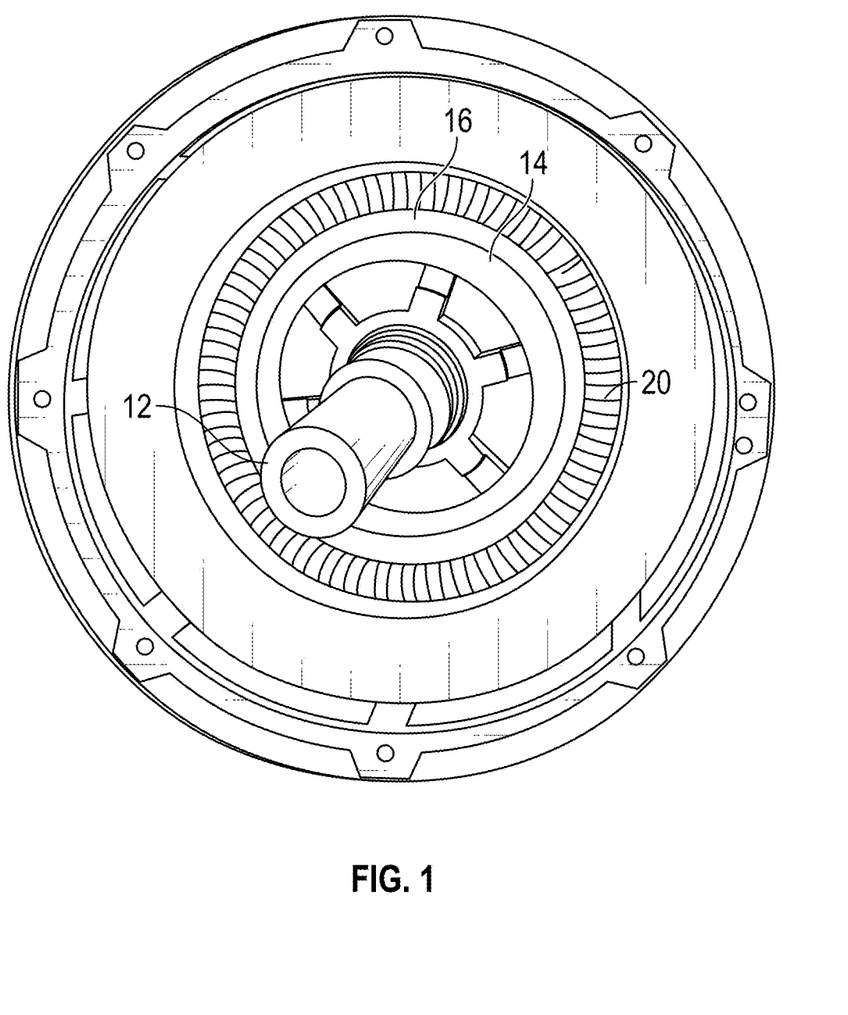
FIG. 1 illustrates a wye ring of a typical rotating electric machine known in the prior art.

Each manufacturer constructs their rotor in a similar manner. With reference to FIG. 1, the rotors typically include a central steel shaft (12); laminations fit to the steel shaft that contain slots for a rotor winding (20); coils that comprise the rotor winding housed in the lamination slots, wherein the coils extend beyond the laminations to be electrically connected (connectors 18 of FIG. 2) to one another and to wye rings (14); and banding (a composite material, typically a polyester but sometimes carbon fiber; 16) applied to the top of the coils to restrain the coils against centrifugal forces.

Figure 2:
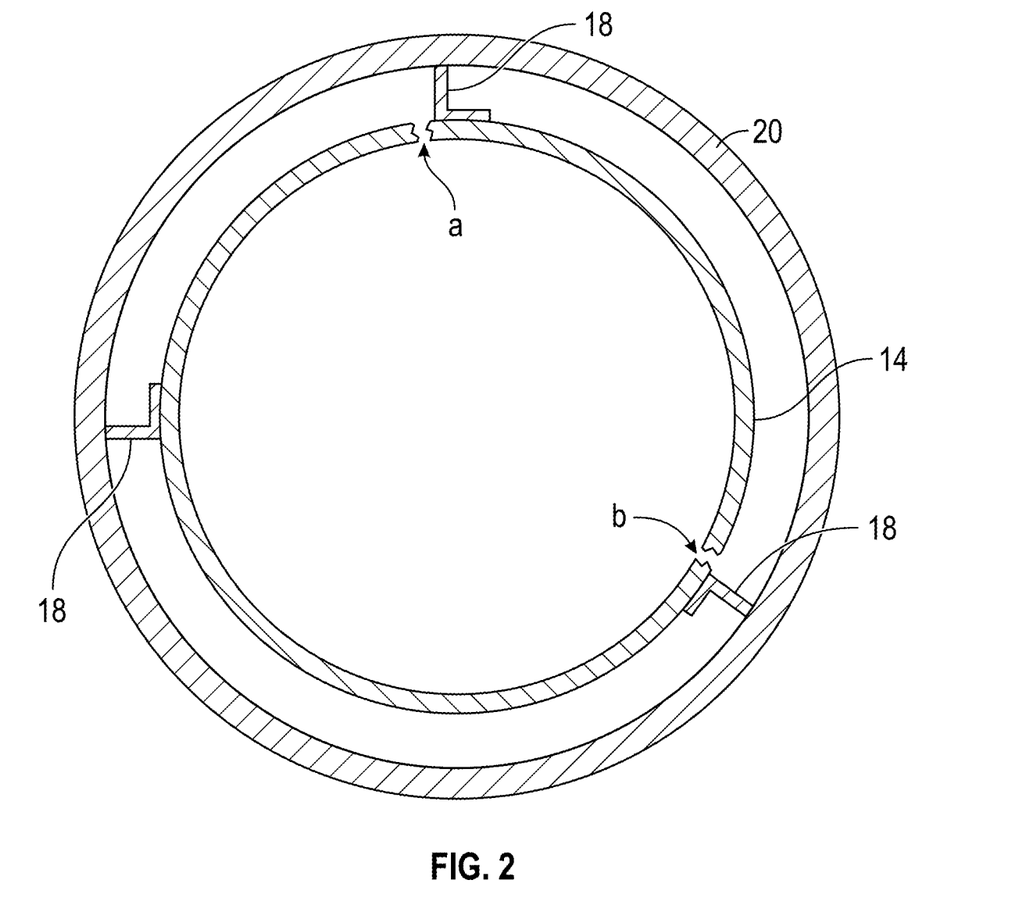
FIG. 2 illustrates connections between the windings and neutral ring of a prior art rotating electric machine.

The banding is a semi-rigid material and dilates with centrifugal forces a small but measurable amount. The coils, which are supported by the banding, will dilate with the banding. Other components, such as the wye ring, dilate significantly less than the banding. Components connected between the wye ring and the coils, such as the connectors 18 shown in FIG. 2, are strained by this differential dilation. These strains are typically a combination of elastic and plastic strains, and these generators are typically subject to cyclic duty due to varying wind conditions. Varying wind equates to varying speed, varying speed equates to varying dilation of the components, varying dilation of the components equates to varying strain and varying strain equates to fatigue of the components.

Fatigue is a metallurgical phenomenon by which a material subject to cyclic (and varying in this case) strains will eventually fracture. These fractured components are also current carrying as they are the parallel, neutral, and phase connections in the rotor winding. Thus, once fractured, the components may fail in a variety of ways but typically fail either mechanically, where the fracture progresses through the thickness of the part creating a complete loss of structural integrity, or electrically, where the initial fracture serves as an initiation site for electrical arcing. Fractures (a, b) in the wye ring 14 near the braze points for connectors 18 are illustrated in FIG. 2. The arcing damages electrical insulation protecting the fractured component which in turn creates a larger electrical failure.

Accordingly, methods that may eliminate the sources of these failures would be desirable. Further, devices and systems that may replace and upgrade existing generator rotor neutral ring connections would be desirable.

SUMMARY

The present disclosure relates to systems for replacement and repair of a neutral ring and connections between a winding and the neutral ring of a rotating electric machine. The neutral ring is spaced apart from a central rotor shaft of the rotating electric machine and the winding is spaced apart from the neutral ring.

According to certain aspects, the system for replacement of a neutral ring in a rotating electric machine generally comprises a neutral ring having first, second, and third ring sections; and first, second, and third neutral ring connectors. Each of the first, second, and third ring sections may comprise two, three, or more laminated layers of copper, and each of the first, second, and third neutral ring connectors may comprise a solid copper structure having a cup-shaped fixture extending radially outward from the neutral ring. The first, second, and third neutral ring connectors may each comprise a first and second attachment point that is brazed to ends of the first, second, and third ring sections to form a contiguous ring. Each of the first, second, and third ring sections may comprise 90-150 degrees of the contiguous ring. The cup-shaped fixture of the first, second, and third neutral ring connectors may be configured for attachment with coils of the winding.

According to certain aspects, the system for replacement of a neutral ring in a rotating electric machine generally comprises a neutral ring having first, second, and third ring sections each comprising three laminated layers of copper, and first and second ring connectors formed of solid copper and brazed to ends of each of the first, second, and third ring sections. Each of the first connectors may comprise a riser that is configured to be attached to a riser of the second connector of an adjacent ring section to form a contiguous ring and, when the first and second connectors are connected, they form a cup shaped fixture at an end of the risers of each of the first and second connectors that extends radially outward from the neutral ring and is configured for attachment with coils of the winding. The risers of adjacent ring sections may be brazed together after the neutral ring is installed, or alternatively, the risers of adjacent ring sections may be brazed together before the neutral ring is installed. Each of the first, second, and third ring sections may comprise 90-150 degrees of the contiguous ring.

According to certain aspects, the system for replacement of a neutral ring in a rotating electric machine generally comprises a neutral ring having two or more laminated layers of copper, and first, second, and third neutral ring connectors extending radially outward from the neutral ring. Each of the first, second, and third neutral ring connectors may comprise a base portion attachable to an outer circumference of the neutral ring, a riser extending radially outward from the base portion, and a cup shaped fixture at an end of the riser that extends radially outward from the neutral ring and is configured for attachment with coils of the winding. The base portion may comprise a copper layer extending from the riser on either side thereof and configured to conform to the outer circumference of the neutral ring. Moreover, each of the first, second, and third neutral ring connectors are separated along an outer circumference of the neutral ring by 90-150 degrees.

The present disclosure also relates to methods for replacing a neutral ring in a rotating electric machine with any of the replacement neutral rings described herein. The method generally comprises providing the system for replacement of a neutral ring in a rotating electric machine; removing the neutral ring from the rotating electric machine; installing the replacement neutral ring; and brazing the cup shaped fixtures to the coils of the winding.

According to certain aspects, the methods for replacing a neutral ring in a rotating electric machine with a replacement neutral ring comprise providing a system comprising: a neutral ring having first, second, and third ring sections each comprising three laminated layers of copper, and first and second ring connectors formed of solid copper and brazed to ends of each of the first, second, and third ring sections. Each of the first connectors may comprise a riser that is configured to be attached to a riser of the second connector of an adjacent ring section to form a contiguous ring, and when the first and second connectors are connected, they form a cup shaped fixture at an end of the risers of each of the first and second connectors that extends radially outward from the neutral ring and is configured for attachment with coils of the winding. The method further comprises removing the neutral ring from the rotating electric machine; installing the first, second, and third neutral ring sections so that the risers of each of the first and second ring connectors of adjacent rings sections are in close proximity; brazing adjacent risers together to form a contiguous ring-shape neutral ring; and brazing the cup shaped fixtures to a proximal coil.

The present disclosure also relates to methods for repair of a neutral ring in a rotating electric machine. The methods generally comprise providing a replacement neutral ring comprising two layers of laminated copper and forming a contiguous ring; cutting the existing neutral ring adjacent each side of a first, second, and third neutral ring connector with a coil of the rotating electric machine so that a portion of the existing neutral ring remains attached to a riser of each of the first, second, and third neutral ring connectors; installing the replacement neutral ring such that an outer circumference of the replacement neutral ring is in contact with an inner circumference of the portions of the existing neutral ring remaining attached to the riser of each of the first, second, and third neutral ring connectors; and brazing the outer circumference of the replacement neutral ring in contact with the inner circumference of the portions of the existing neutral ring remaining attached to the risers. The method may be performed on the rotating electric machine located in situ within a wind turbine.

According to aspects of the various systems and methods, the copper of each ring section, riser, and connection may be an electrolytic tough pitch copper or an oxygen free high conductivity copper. According to aspects of the various systems and methods, the copper of each neutral ring layer may be an electrolytic tough pitch copper or an oxygen free high conductivity copper.

DESCRIPTION OF THE DRAWINGS

The present invention is described in detail below with reference to the accompanying drawings. Where several embodiments are disclosed, similar components having similar functions may be denoted by an identical reference number. The embodiments below describe an alternating-current excitation synchronous rotating electric machine (i.e., doubly-fed induction generator) as an example but are applicable to any winding type rotating electric machine. The description below is merely exemplary of particular possible embodiments and is not intended to limit an aspect of the present invention to the specific aspects described below.

DETAILED DESCRIPTION

In the following description, the present invention is set forth in the context of various alternative embodiments and implementations involving systems and methods to ameliorate failures in prior art connection schemes for rotating electric machines, such as mechanical and/or electrical failures in doubly-fed induction generators caused by differential expansion of components under centrifugal forces, improper design and/or strength of the components, and the like.

Before describing the devices, systems, and methods of the present invention in detail, the following definitions and abbreviations are provided to aid in a better understanding of the scope of the present disclosure.

Definitions and Abbreviations

Various aspects of the neutral ring connection replacement and repair parts and methods of their installation as disclosed herein may be illustrated with reference to one or more exemplary implementations. As used herein, the term "exemplary" means "serving as an example, instance, or illustration," and should not necessarily be construed as preferred or advantageous over other variations of the systems, parts, and methods disclosed herein.

"Optional" or "optionally" means that the subsequently described component, event, or circumstance may or may not be included or occur, and the description encompasses instances where the component or event is included and instances where it is not.

Various aspects of the neutral ring connection replacement and repair parts may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Furthermore, throughout the specification, reference to "embodiments" or "aspects" indicate that a particular described feature, structure, or characteristic may be included in at least one embodiment of the systems, devices, and methods disclosed herein. Thus, appearances of the phrases "in one embodiment," "according to aspects," or "according to certain aspects" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the various parts of the systems and devices disclosed herein may be used unless otherwise indicated. By way of example, if aspects of the neutral ring connection replacement and repair parts shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to "a" ring section is a reference to one or more ring sections and equivalents thereof known to those skilled in the art, and so forth.

Unless defined otherwise, all technical and scientific terms used herein have the same meanings as commonly understood by one of ordinary skill in the art.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the terms "include", "includes", and "including" are meant to be non-limiting. As generally used herein, the terms "have", "has", and "having" are meant to be non-limiting.

ASPECTS OF THE DISCLOSURE

The presently disclosed components and methods repair and/or upgrade components of a rotating electric machine that typically lead to mechanical and electrical failures. The inventive components may replace the original manufacturer's neutral or "wye" ring connection components with retrofit components or an entire retrofit assembly that is applicable to 1.5 MW and 1.6 MW rotating electric machines such as the doubly fed induction generators (DFIG) manufactured by Hitachi and General Electric. Moreover, the inventive components can be installed in shop or up-tower (in the nacelle of a wind turbine).

Prior art generator rotors typically fail at or near the brazed connections on the neutral ring through low-cycle fatigue failure, resulting from cyclic loading (see break points a and b in FIG. 2). In addition, the copper material used in the prior art wye rings and connectors is susceptible to hydrogen embrittlement introduced during the manufacturing process, resulting in a decrease of the material's ductility and fatigue strength.

Figure 3:
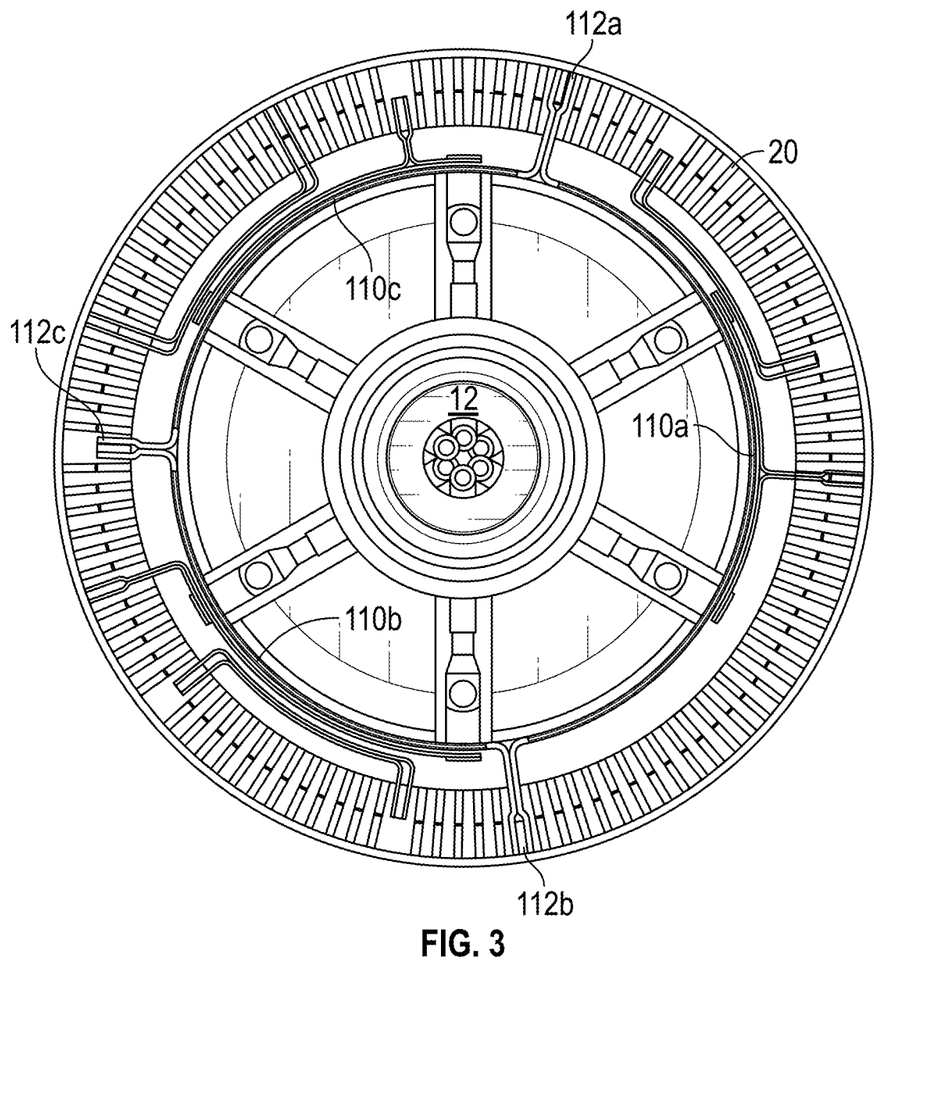
FIG. 3 illustrates a neutral ring connection replacement according to aspects of the present disclosure positioned within a rotating electric machine.
Figure 4A:
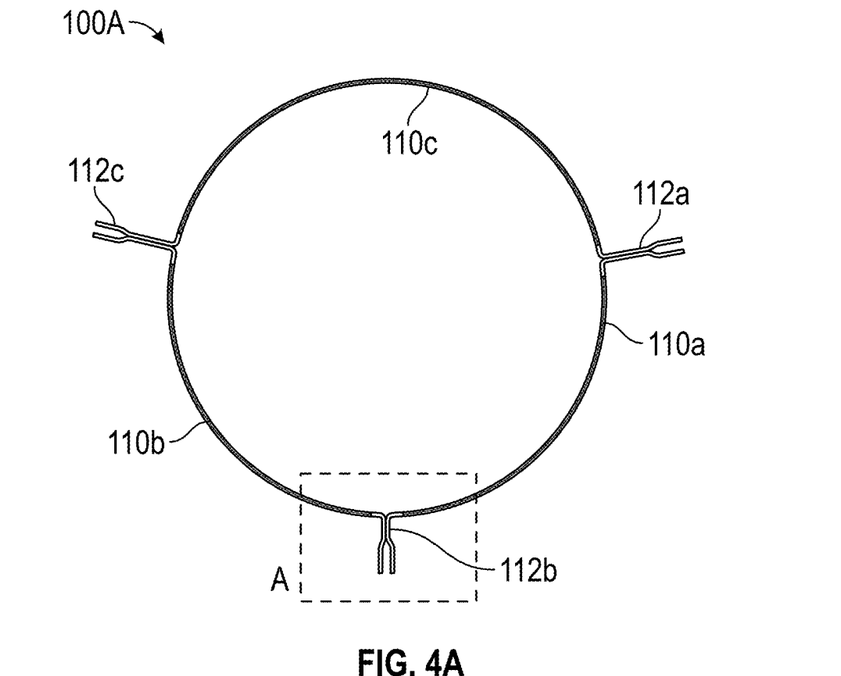
FIG. 4A illustrates the neutral ring connection replacement shown in FIG. 3.
Figure 4B:
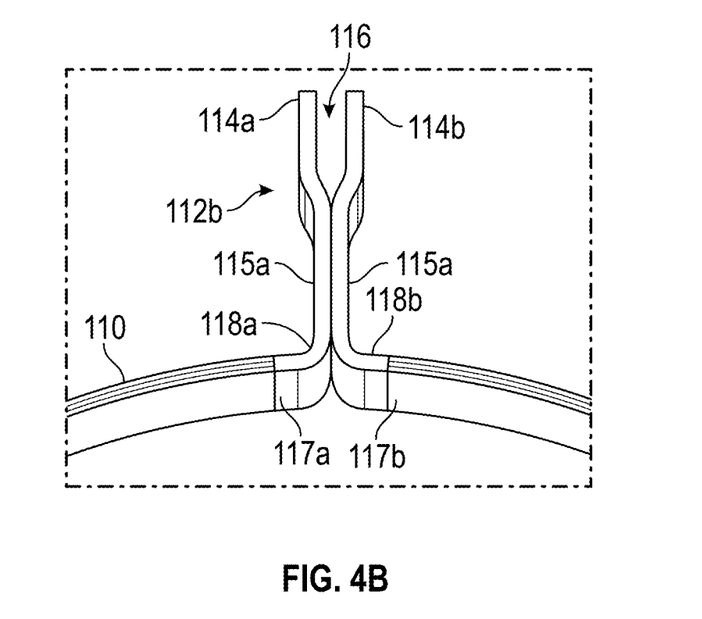
FIG. 4B illustrates a close-up view of section A of the neutral ring connection replacement shown in FIG. 4A.

The present inventors have designed a novel neutral ring and connectors for attachment to the coil. The neutral ring comprises laminated copper sheets that form a ring and is brazed at three (3) locations corresponding to the neutral connections that may be used in a complete replacement of the prior art neutral ring and connectors (FIGS. 3, 4A, and 4B). Additionally, the neutral ring is formed of a copper material that is be free of hydrogen embrittlement. This combination of features, a novel design and improved materials, reduces the strain on the neutral ring and thus extends the life of the connection.

With reference to FIGS. 3, 4A, and 4B, the neutral ring 100A includes first 110a, second 110b, and third 110c ring sections and first 112a, second 112b, and third 112c neutral ring connectors. Each of the first 110a, second 110b, and third 110c ring sections may comprise two, three, or more laminated layers of copper. As shown in FIG. 4B, according to preferred aspects, the ring sections may comprise three laminated layers of copper that distribute the stresses and strains imposed on the neutral ring and connections during centrifugal movement, thus greatly improving the life span of the components.

Each of the first 112*a*, second 112*b*, and third 112*c* neutral ring connectors may comprise a solid copper structure having a cup-shaped fixture extending radially outward from the neutral ring. As shown in FIG. 4B, which is an enlargement of the region A in the dotted box of FIG. 4A, the cup shaped structure is formed by connection between risers (e.g., 115*a*, 115*b*) having solid portions at ends thereof (114*a*, 114*b*) that are spaced apart from each other to form a slot 116 configured for attached to a coil of the rotating electric machine.

The first, second, and third neutral ring connectors may each comprise a first and second attachment point (117*a*, 117*b*) that is brazed to ends of the first 110*a*, second 110*b*, and third 110*c* ring sections to form a contiguous ring 100A. While shown in the figures as H connections with splayed ends, other shapes are possible and within the scope of the present invention.

Each of the first 110*a*, second 110*b*, and third 110*c* ring sections may comprise 90-160 degrees of the contiguous ring 100A. The cup-shaped fixture of the first, second, and third neutral ring connectors may be configured for attachment with coils of the winding. Thus, this neutral ring is intended for replacement or repair of a doubly-fed induction generator, as described hereinabove.

The system may be provided as a single component, such as shown in FIG. 4A. In this case, adjacent risers would be brazed and attached to each other to form the contiguous ring. The present disclosure also relates to methods for replacing a neutral ring in a rotating electric machine. The method generally comprises providing any of the preplacement systems described hereinabove, such as shown in FIGS. 4A and 4B; removing the neutral ring from the rotating electric machine; installing the replacement neutral ring; and brazing the cup shaped fixtures to the coil.

Alternatively, each of the ring sections (110*a-c*) may be provided with one side of the riser and cup shaped fixture (i.e., 115*a*, 114*a*, respectively) attached via an end 117*a* of a base portion 118*a* of the connector. In this case, each ring section may be installed individually, and adjacent risers may be brazed to form the contiguous ring. That is, the present invention may provide a neutral ring 100A having first 110*a*, second 110*b*, and third 110*c* ring sections, and first and second ring connectors (118*a*, 118*b*, respectively) formed of solid copper and brazed to ends (117*a*, 117*b*) of each of the first, second, and third ring sections.

Each of the first connectors 118*a* may comprise a riser 115*a* that is configured to be attached to a riser 115*b* of the second connector 118*b* of an adjacent ring section to form a contiguous ring. When the first and second connectors are connected, they form a cup shaped fixture (114*a*, 114*b*) at an end of the risers of each of the first and second connectors that extends radially outward from the neutral ring and is configured for attachment with coils of the winding.

Accordingly, a method of the present invention may further comprise removing the neutral ring from the rotating electric machine; installing the first, second, and third neutral ring sections so that the risers of each of the first and second ring connectors of adjacent rings sections are in close proximity; brazing adjacent risers together to form a contiguous ring-shaped neutral ring; and brazing the cup shaped fixtures to a proximal coil.

Figure 5A:
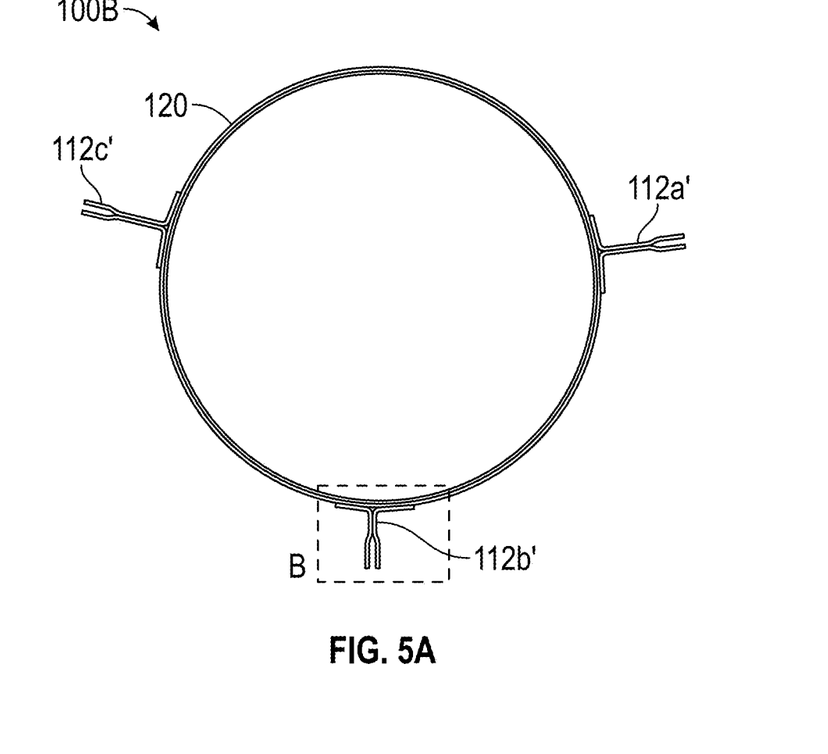
FIG. 5A illustrates a neutral ring connection replacement according to aspects of the present disclosure.
Figure 5B:
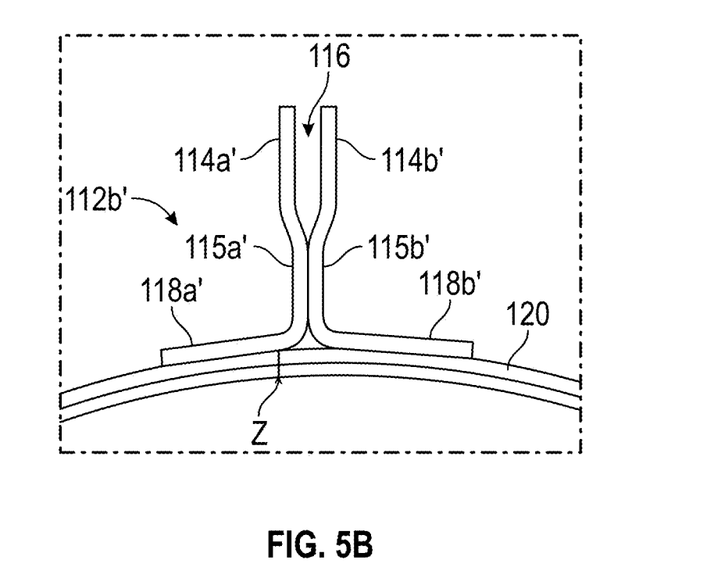
FIG. 5B illustrates a close-up view of section B of the neutral ring connection replacement shown in FIG. 5A.

Another inventive design for a neutral ring replacement is shown in FIGS. 5A and 5B. The neutral ring 100B includes an inner laminated ring 120 comprising two, three, or more layers of copper. Attachable or attached along an outer circumference of the ring 120 are two, three, or more neutral ring connectors, such as the first 112*a*', second 112*b*', and third 112*c*' neutral ring connectors shown in FIG. 5A. As shown in FIG. 5B, which is an enlargement of the region B in the dotted box of FIG. 5A, each connector includes a base portion (118*a*', 118*b*') attachable to an outer circumference of the ring 120, such as by brazing. Extending radially outward from the base portion (118*a*', 118*b*') are risers (115*a*', 115*b*') having solid portions at ends thereof (114*a*', 114*b*') that are spaced apart from each other to form a slot 116 configured for attachment to a winding of the rotating electric machine.

The ring 120 may include a single point of disconnect (z) to allow for adjustability on installation, e.g., trimming of the ring 120 to suit the field diameter (shown in FIG. 5B) or expansion of a diameter of the ring 120 by inclusion of a gap. As shown, the disconnect z may be positioned below one of the neutral ring connectors (e.g., one of the first 112*a*', second 112*b*', and third 112*c*' neutral ring connectors). As such, the neutral ring connector positioned over the disconnect may be connected, such as by brazing, to the neutral ring during installation of the neutral ring replacement so that the correct sizing may be achieved.

Traditionally, methods for repair of a neutral ring in a rotating electric machine, such as a doubly-fed induction generator used in a wind tower, require the entire generator be removed from the wind tower. This is a time consuming, costly, and demanding task. First the turbine must be disconnected from its mountings and separated from the gear box and the turbine rotors. The nacelle housing must be removed to gain access and the turbine lifted by crane or helicopter from the tower and lowered to the ground. On the ground the end of the turbine must be disassembled to permit the damaged ring to be removed and a new ring moved into place and mounted. Once the new ring has been secured in place, the generator must be reassembled as necessary, hoisted to its position on top of the tower, and remounted.

The present inventors have further configured the neutral ring for up-tower repair (FIGS. 6, 7A, and 7B) of the prior art rotor connection, which leaves a portion of the neutral ring and connection in place. Accordingly, with specific reference to FIG. 7A, a neutral ring 130 comprising two, three, or more laminated layers of copper is provided and useful for up-tower repair of the neutral ring.

Figure 7A:
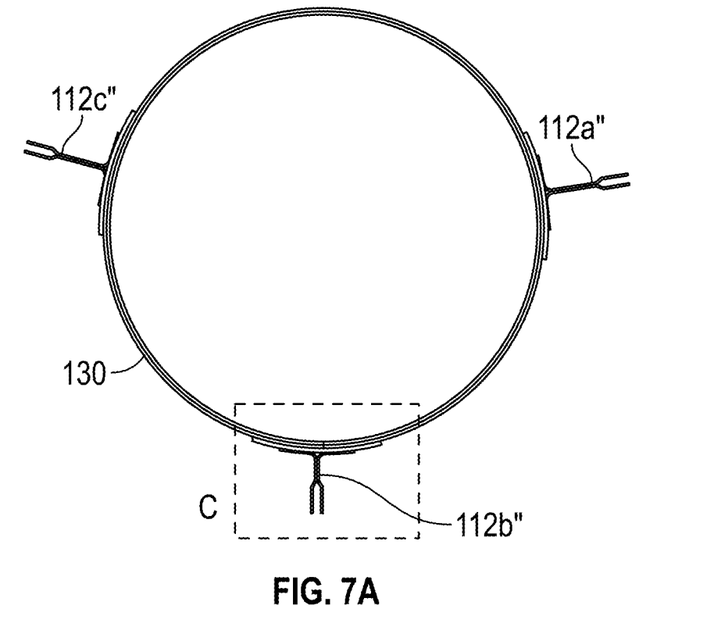
FIG. 7A illustrates the neutral ring connection repair shown in FIG. 6.
Figure 7B:
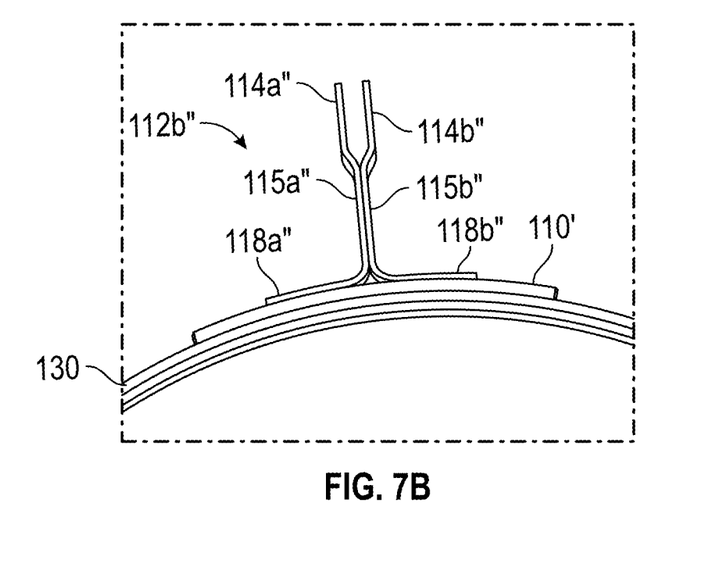
FIG. 7B illustrates a close-up view of section C of the neutral ring connection repair shown in FIG. 7A.

A method of repairing the neutral ring may generally comprise providing a replacement neutral ring 130 comprising two, three, or more layers of laminated copper and forming a contiguous ring. As shown in FIG. 7B, which is an enlargement of the region C in the dotted box of FIG. 7A, the existing neutral ring 110' may be cut adjacent to each side of a first 112*a*'', second 112*b*'', and third 112*c*'' neutral ring connector that provides connection to a coil (winding) of the rotating electric machine so that a portion of the existing neutral ring (110' of FIG. 7B) remains attached to a riser (115*a*'', 115*b*'') of each of the first 112*a*'', second 112*b*'', and third 112*c*'' neutral ring connectors.

After removal of the existing neutral ring, the replacement neutral ring 130 may be installed such that an outer circumference of the replacement neutral ring is in contact with an inner circumference of the portions of the existing neutral ring (110') remaining attached to the risers (118*a*'', 118*b*'') of each of the first, second, and third neutral ring connectors (112*a*'', 112*b*'', 112*c*''). These regions of close contact, i.e., the outer circumference of the replacement neutral ring 130 in contact with the inner circumference of the portions of the existing neutral ring 110' remaining attached to the risers, are brazed to form the repaired neutral ring.

Figure 6:
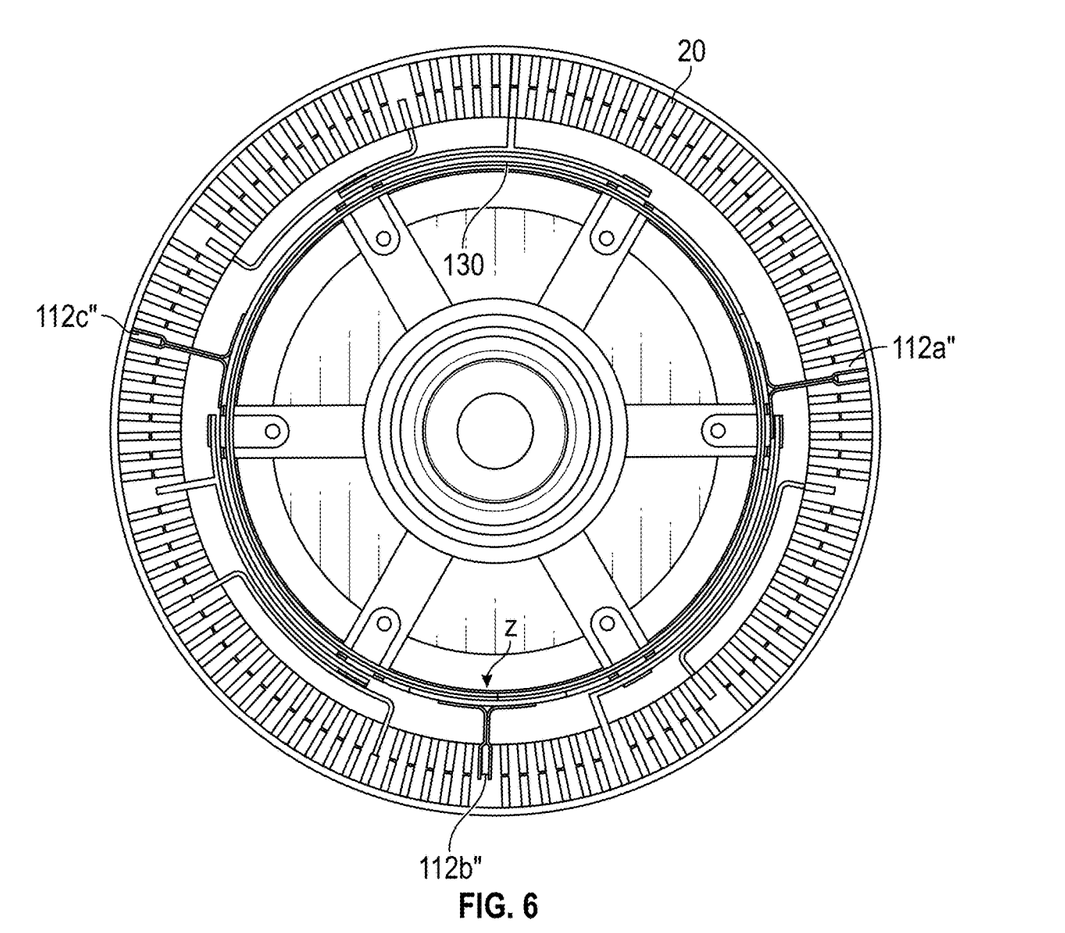
FIG. 6 illustrates a neutral ring connection repair according to aspects of the present disclosure positioned within a rotating electric machine.

This method may be performed on the rotating electric machine located in situ within a wind turbine. Moreover, according to certain aspects, a single point of disconnect (z) may be included in the ring to allow for adjustability on installation, such as by trimming the ring 130 to suit the field diameter or expansion of a diameter of the ring 130 by inclusion of a gap. As shown in FIG. 6, the disconnect z may be positioned below one of the neutral ring connectors (e.g., one of the first 112a", second 112b", and third 112c" neutral ring connectors). As such, the neutral ring connector positioned over the disconnect may be connected, such as by brazing, to the neutral ring during installation of the neutral ring replacement so that the correct sizing may be achieved.

According to aspects of the various systems and methods, the copper of each ring section, riser, and connection may be an electrolytic tough pitch copper or an oxygen free high conductivity copper. According to aspects of the various systems and methods, the copper of each neutral ring layer may be an electrolytic tough pitch copper or an oxygen free high conductivity copper.

The following aspects are disclosed in this application:

Aspect 1: A system for replacement of a neutral ring in a rotating electric machine, the system comprising: a neutral ring having first, second, and third ring sections each comprising three laminated layers of copper; and first and second ring connectors formed of solid copper and brazed to ends of each of the first, second, and third ring sections, wherein each of the first and second ring connectors comprise a riser, wherein the riser of the first ring connector is configured to be attached to the riser of the second ring connector of an adjacent ring section to form a contiguous ring, and wherein, when the first and second ring connectors are connected, they form a cup shaped fixture at an end of the risers of each of the first and second connectors that extends radially outward from the neutral ring and is configured for attachment to a winding of the rotating electric machine.

Aspect 2: The system according to aspect 1, wherein the risers of each of the first, second, and third ring sections are brazed to the risers of an adjacent ring section to form a continuous neutral ring having first, second, and third neutral ring connectors each having the cup shaped fixture.

Aspect 3: A system for replacement of a neutral ring in a rotating electric machine, the system comprising: a neutral ring having two or more laminated layers of copper; and first, second, and third neutral ring connectors extending radially outward from the neutral ring, wherein each of the first, second, and third neutral ring connectors comprise a base portion attachable to an outer circumference of the neutral ring, a riser extending radially outward from the base portion, and a cup shaped fixture at an end of the riser that extends radially outward from the neutral ring and is configured for attachment with a winding of the rotating electric machine.

Aspect 4. The system according to aspect 3, wherein the base portion comprises a copper layer extending from the riser on either side thereof and configured to conform to the outer circumference of the neutral ring.

Aspect 5: The system according to aspect 3 or 4, wherein the base portions of none, one, two, or all three of the first, second, and third neutral ring connectors are brazed to the neutral ring.

Aspect 6: The system according to any one of aspects 3 to 5, wherein the base portions of the first and second neutral ring connectors are brazed to the neutral ring, and the third neutral ring connector is not connected.

Aspect 7: The system according to aspects 5 or 6, wherein the neutral ring includes a single break point at a position within a connection region of one of the neutral ring connectors that is not brazed to the neutral ring.

Aspect 8: The system according to any previous aspect, wherein each of the first, second, and third ring sections comprise 90-150 degrees of the contiguous ring.

Aspect 9: The system according to any previous aspect, wherein the copper of any listed component, e.g., first, second, and third ring sections; and first, second, and third neutral ring connectors, is an electrolytic tough pitch copper or an oxygen free high conductivity copper.

Aspect 10: A method of replacing a neutral ring in a rotating electric machine with a replacement neutral ring, the method comprising: removing the neutral ring from the rotating electric machine; positioning the first, second, and third neutral ring sections of the system according to any one of aspects 1, 2, 8, and 9 within the rotating electric machine so that the risers of each of the first and second ring connectors of adjacent rings sections are in close proximity and are positioned proximal to a winding of the rotating electric machine; connecting adjacent risers together by brazing to form a contiguous ring-shaped neutral ring; and connecting the cup shaped fixtures formed by connection of the adjacent risers to the winding of the rotating electric machine by brazing.

Aspect 11: A method for replacing a neutral ring in a rotating electric machine with a replacement neutral ring, the method comprising: removing the neutral ring from the rotating electric machine; positioning the continuous neutral ring of the system according to any one of aspects 3, 4, 8, and 9 in a location previously occupied by the neutral ring; and connecting the cup shaped fixtures of the first, second, and third neutral ring connectors to a winding of the rotating electric machine by brazing.

Aspect 12: A method for replacing a neutral ring in a rotating electric machine with a replacement neutral ring, the method comprising: removing the neutral ring from the rotating electric machine; positioning a replacement neutral ring according to the system of any one of aspects 3 to 9 in a location previously occupied by the neutral ring; adjusting a length of the replacement neutral ring by removing a length of the replacement neutral ring at the single break point, or expanding a circumference of the replacement neutral ring by including a gap at the single break point; connecting the cup shaped fixtures of the neutral ring connectors to a winding of the rotating electric machine by brazing; connecting the base portion of a disconnected neutral ring connector to a position over the single break point by brazing; and connecting any other disconnected neutral ring connectors to the neutral ring by brazing, wherein any of the steps after adjusting the length of the replacement neutral ring may be carried out in any order.

Aspect 13: A method for repair of an existing neutral ring in a rotating electric machine, the method comprising: cutting an existing neutral ring at a point adjacent each side of a first, second, and third neutral ring connector so that a portion of the existing neutral ring remains attached to a riser of each of the first, second, and third neutral ring connectors, wherein the first, second, and third neutral ring connectors provide connection between the existing neutral ring and a winding of the rotating electric machine; positioning a replacement neutral ring comprising two or more layers of laminated copper having a single break point so that an outer circumference of the replacement neutral ring is in contact with an inner circumference of the portions of the existing neutral ring remaining attached to the riser of each of the first, second, and third neutral ring connectors; and connecting the outer circumference of the replacement neutral ring in contact with the inner circumference of the portions of the existing neutral ring remaining attached to the risers by brazing.

Aspect 14: The method according to aspect 13, wherein positioning the replacement neutral ring includes, if needed, adjusting a length of the replacement neutral ring by removing a length of the replacement neutral ring at the single break point, or expanding a circumference of the replacement neutral ring by including a gap at the single break point.

Aspect 15: The method according to aspect 13 or 14 performed in the rotating electric machine located in situ within a wind turbine.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A method for repair of an existing neutral ring in a rotating electric machine, the method comprising:
    cutting an existing neutral ring at a point adjacent each side of a first, second, and third neutral ring connector so that a portion of the existing neutral ring remains attached to a riser of each of the first, second, and third neutral ring connectors, wherein the first, second, and third neutral ring connectors provide connection between the existing neutral ring and a winding of the rotating electric machine;
    positioning a replacement neutral ring comprising two or more layers of laminated copper having a single break point so that an outer circumference of the replacement neutral ring is in contact with an inner circumference of the portions of the existing neutral ring remaining attached to the riser of each of the first, second, and third neutral ring connectors; and
    connecting the outer circumference of the replacement neutral ring in contact with the inner circumference of the portions of the existing neutral ring remaining attached to the risers by brazing.

2. The method of claim 1, wherein positioning the replacement neutral ring includes adjusting a length of the replacement neutral ring by removing a length of the replacement neutral ring at the single break point.

3. The method of claim 1 performed in the rotating electric machine located in situ within a wind turbine.

4. The method of claim 1, wherein the single break point is positioned below one of the first, second, or third neutral ring connectors.

5. The method of claim 1, wherein the copper of the replacement neutral ring is an electrolytic tough pitch copper or an oxygen free high conductivity copper.

6. The method of claim 1, wherein positioning the replacement neutral ring includes adjusting a length of the replacement neutral ring by inclusion of a gap in the replacement neutral ring at the single break point, wherein the gap is positioned below one of the first, second, or third neutral ring connectors.

7. The method of claim 6, wherein the single break point is positioned below one of the first, second, or third neutral ring connectors.

8. A method for repair of an existing neutral ring in a rotating electric machine, the method comprising:
    cutting an existing neutral ring at a point adjacent each side of a first, second, and third neutral ring connector so that a portion of the existing neutral ring remains attached to a riser of each of the first, second, and third neutral ring connectors, wherein the first, second, and third neutral ring connectors provide connection between the existing neutral ring and a winding of the rotating electric machine;
    positioning a replacement neutral ring comprising two or more layers of laminated copper having a single break point so that an outer circumference of the replacement neutral ring is in contact with an inner circumference of the portions of the existing neutral ring remaining attached to the riser of each of the first, second, and third neutral ring connectors; and
    connecting the outer circumference of the replacement neutral ring in contact with the inner circumference of the portions of the existing neutral ring remaining attached to the risers by brazing,
    wherein positioning the replacement neutral ring includes adjusting a length of the replacement neutral ring by removing a length of the replacement neutral ring at the single break point, or expanding a circumference of the replacement neutral ring by including a gap at the single break point.

9. The method of claim 8 performed in the rotating electric machine located in situ within a wind turbine.

10. The method of claim 8, wherein the single break point is positioned below one of the first, second, or third neutral ring connectors.

11. The method of claim 8, wherein the copper of the replacement neutral ring is an electrolytic tough pitch copper or an oxygen free high conductivity copper.

* * * * *